United States Patent [19]

Brugerolle et al.

[11] Patent Number: 5,679,134
[45] Date of Patent: Oct. 21, 1997

[54] DEVICE AND PROCESS FOR THE SEPARATION OF GAS BY ADSORPTION

[75] Inventors: Jean-Renaud Brugerolle; Christian Monereau, both of Paris, France

[73] Assignee: L'Air Liquide, Societe Anonyme pour l'Etude et l'Exploitation des Procedes Georges Claude, Paris Cedex, France

[21] Appl. No.: 552,312

[22] Filed: Nov. 8, 1995

[30] Foreign Application Priority Data

May 19, 1995 [FR] France .................. 95 05956

[51] Int. Cl.$^6$ .................. B01D 53/047
[52] U.S. Cl. .................. 95/96; 95/103; 95/130; 96/130; 96/133; 96/144
[58] Field of Search ........... 95/95–105, 130; 96/108, 115, 121, 128, 130, 133, 143, 144

[56] References Cited

U.S. PATENT DOCUMENTS

| | | | |
|---|---|---|---|
| 3,121,625 | 2/1964 | Broughton | 95/96 |
| 3,313,092 | 4/1967 | Potts | 96/143 X |
| 3,498,025 | 3/1970 | Bednarski | 95/102 |
| 4,222,750 | 9/1980 | Gauthier et al. | 95/130 X |
| 4,354,859 | 10/1982 | Keller, II et al. | 96/143 X |
| 4,502,873 | 3/1985 | Mottram et al. | 96/130 X |
| 4,534,346 | 8/1985 | Schlaechter | 96/144 X |
| 4,561,865 | 12/1985 | McCombs et al. | 96/143 X |
| 4,576,616 | 3/1986 | Mottram et al. | 96/130 X |
| 4,685,941 | 8/1987 | Sato | 96/144 X |
| 4,892,566 | 1/1990 | Bonsal et al. | 96/115 X |
| 5,370,728 | 12/1994 | LaSala et al. | 96/144 X |

FOREIGN PATENT DOCUMENTS

| | | | |
|---|---|---|---|
| 0 038 410 | 10/1981 | European Pat. Off. . | |
| 0 525 521 | 2/1993 | European Pat. Off. . | |
| 2138663 | 1/1973 | France . | |
| 2 337 754 | 2/1974 | Germany . | |
| 34 05 260 | 8/1985 | Germany . | |
| 3743008 | 6/1989 | Germany | 95/96 |
| 4102637 | 6/1991 | Germany | 95/96 |
| 2-237610 | 9/1990 | Japan | 96/108 |
| 3-047512 | 2/1991 | Japan | 96/108 |
| WO88/05693 | 8/1988 | WIPO . | |

*Primary Examiner*—Robert Spitzer
*Attorney, Agent, or Firm*—Young & Thompson

[57] ABSTRACT

A device for the separation of gas by adsorption, of the so-called VSA or MPSA type, comprises, between a utilization line (L) and a source (S) of gaseous mixture to be separated, at least one module (M) comprising in series a reversible rotatable machine (R), typically a Roots, an adsorber (A) and a shut-off valve (V). The rotary machine (R) is alternately actuated, in one direction during a first phase of pressurization and of production and then, in the other direction, during a second phase of depressurization and desorption. Used particularly in the production of small and medium volumes of oxygen in modular installations.

20 Claims, 3 Drawing Sheets

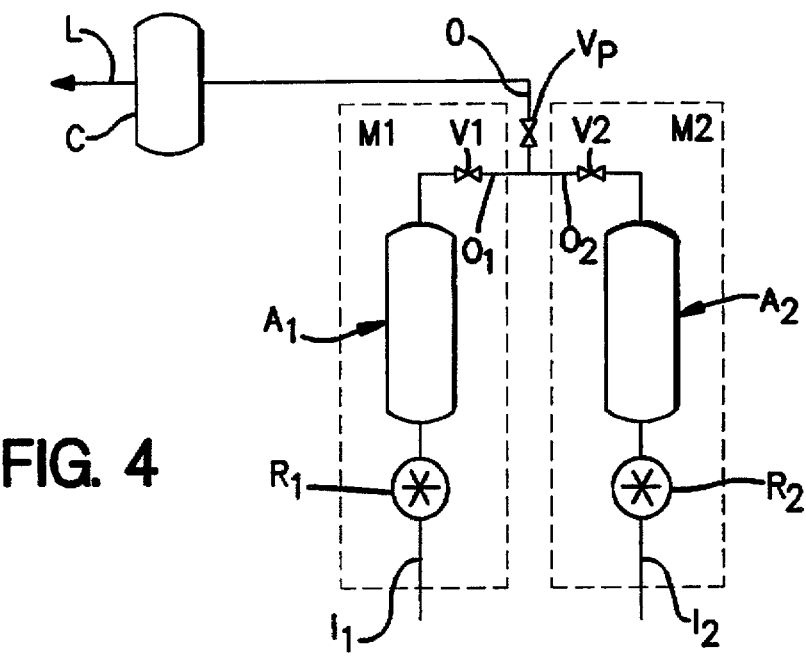
FIG. 4
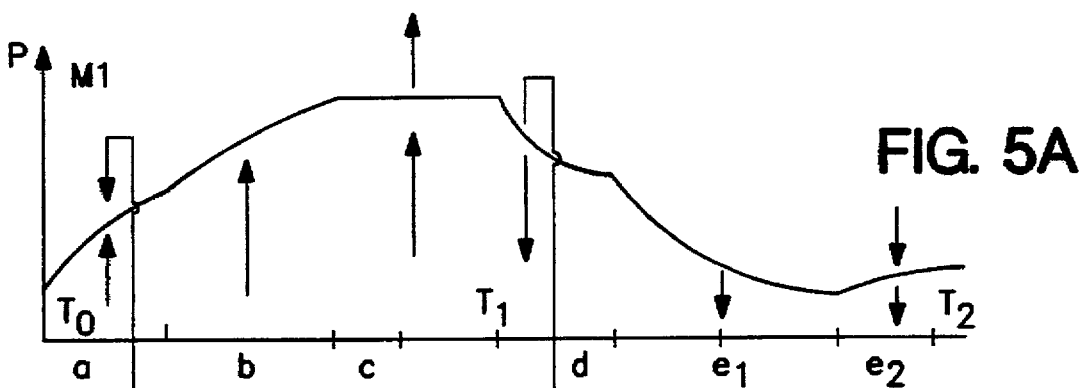
FIG. 5A
FIG. 5B
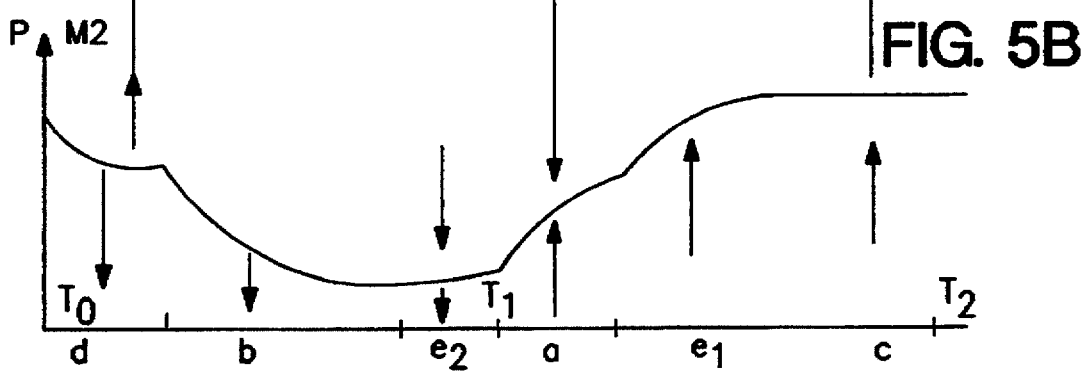
FIG. 5C

a
DEVICE AND PROCESS FOR THE SEPARATION OF GAS BY ADSORPTION

FIELD OF THE INVENTION

The present invention relates to devices for the separation of gas by adsorption with variable pressure, of the so-called VSA or MPSA type, and more particularly devices of medium or small capacity comprising at least one rotary machine acting on an adsorber as a compressor or a pump.

BACKGROUND OF THE INVENTION

The known devices, as described in U.S. Pat. No. 4,534,346 of 1983 and, more recently, in U.S. Pat. No. 5,370,728 of 1993, comprise a rotary machine having a high pressure side and a low pressure side and actuated in rotation continuously in the same direction and at the same speed, the optimization of the level of the rotary machine being however largely counterbalanced by the use of numerous valves whose number, on the one hand, and adjustment and maintenance of their synchronization, on the other hand, greatly increase the cost of production and use.

SUMMARY OF THE INVENTION

The present invention has for its object to provide an adsorption device permitting simplifying the circuitry and greatly limiting the number of valves particularly by omitting any valve or circuitry accessory permitting modifying selectively the gas circuits on opposite sides of the rotary machine, and thereby permitting the production of individual adsorption modules having a large flexibility of use and permitting their association in groups of modules in parallel permitting covering wide ranges of use and operating conditions.

To do this, according to one characteristic of the invention, the device comprises at least one adsorption module containing at least one adsorber having an inlet adapted to receive a gaseous mixture to be separated and an outlet connectable, via at least one valve, to a utilization line for gas impoverished in at least one of the constituents, a reversible rotary machine having first and second openings for the passage of opposed gases, the first opening communicating continuously with a source of said gaseous mixture and a second opening communicating continuously with the inlet of the adsorber, and means to actuate in consequence the rotary machine in opposite directions of rotation.

According to another characteristic of the invention, the device comprises at least two such individual modules disposed in parallel between the source of gaseous mixture and the utilization line.

The present invention also has for its object to provide processes for using such devices, leading to a wide range of uses and for the separation of different gases.

According to one aspect of the invention, the rotary machine associated with an adsorber is alternately actuated, during a first phase, or supply phase with gas from the adsorber in one direction, then during a second phase, or extraction phase of gas beyond the adsorber, in the other direction.

According to a more particular characteristic of the invention, the driving of the machine is interrupted for a predetermined period at the end of each phase.

With a device and a process according to the invention, there is no shut-off valve on opposite sides of the rotary machine, and particularly between this latter and the inlet of the adsorber, the reversibility of this rotary machine permitting ensuring alternately and successively compression of the gaseous mixture to be separated to a high pressure of the cycle for the adsorption step and pumping under vacuum to a low pressure of the cycle for a desorption step, the reversal taking place in a flexible and economical manner by using to the maximum the autorotations resulting from the reverse pressure differentials and from the inertial forces of the rotating structure of the machine.

BRIEF DESCRIPTION OF THE DRAWINGS

Other characteristics and advantages of the present invention will become apparent from the following description of embodiments given by way of non-limiting example, with respect to the accompanying drawings, in which:

FIG. 4 is a schematic view of a device using two modules according to FIG. 1;

FIG. 5 is a graph, analogous to that of FIG. 3, showing the opening/closing cycles of the valves of the device of FIG. 4;

DETAILED DESCRIPTION OF THE INVENTION

Figure 1:
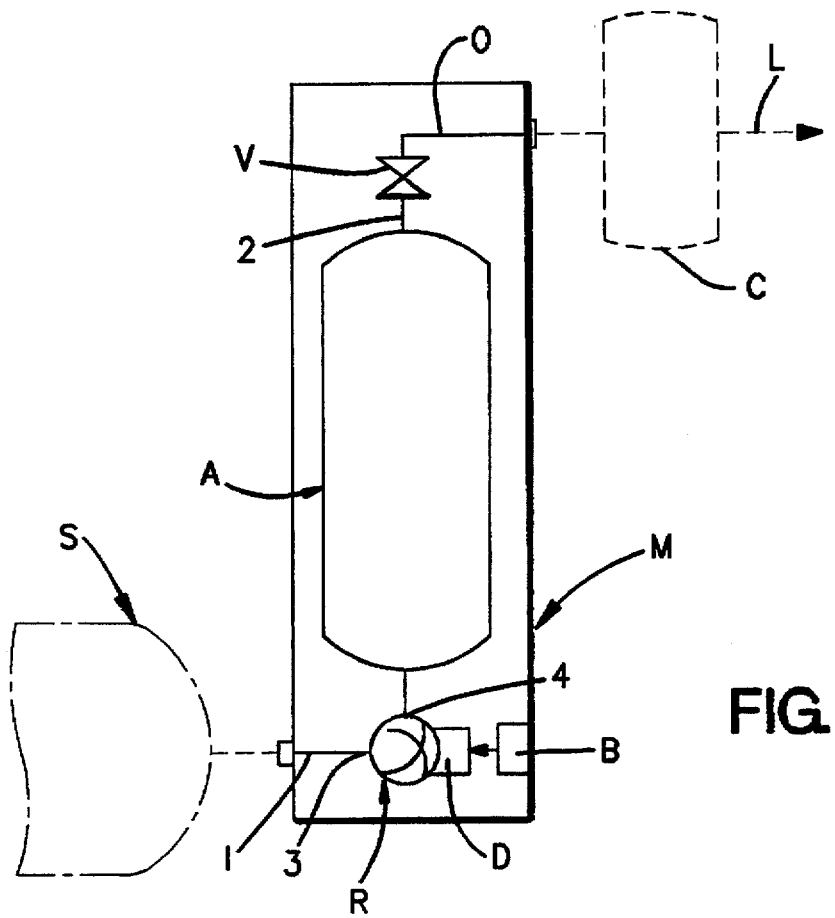
FIG. 1 is a schematic view of a unitary adsorption module according to the invention.

In the description which follows and in the designs, identical or analogous elements have the same reference numerals, sometimes primed.

In FIG. 1, there is shown an adsorption module M according to the invention comprising typically an adsorber A, of typical vertical configuration, having an inlet 1 and an outlet 2 and containing at least one adsorbent capable of retaining at least one constituent of a gaseous mixture to be separated. The inlet I is connected to an inlet conduit 1 by a reversible rotary machine R, typically a Roots or a machine with multi-lobed rotors, driven by an electric motor D controlled by a control housing B. The outlet 2 is connected to an outlet conduit 0 having a shut-off electrovalve V. The outlet conduit 0 is adapted to be connected, typically via a storage C, to a utilization line L, whilst the inlet conduit I is adapted to be connected to a source S of gaseous mixture to be separated which can accept a rejection of residual gas by the device of the invention. According to one particular use of the invention, the gaseous mixture to be separated is air, the source S being the ambient atmosphere, the adsorber containing at least one adsorbent capable of retaining by adsorption the unwanted constituents of the constituent to be produced, which is typically oxygen or if desired nitrogen.

There are shown on FIG. 2 the associated cycles of pressure (above) and of rotation of the rotary machine (below). The pressure cycle comprises a pressurization and production phase T0–T1, between the low pressure $P_m$ of the cycle, lower than atmospheric pressure Pa, and the high pressure of the cycle $P_M$, slightly greater than the atmospheric pressure, and a depressurization and desorption phase T1–T2, between the pressures $P_M$ and $p_m$. The rotary machine is driven by the motor only during the central portions j and j' of the cycle phases. Thus, the blower being driven by the electric motor in compression step j, a short period of time before the reversal time $T_1$ between the two phases, the supply of the motor is interrupted, the rotary machine continues its action, under the effect of kinetic energy, during step k until it naturally stops at time $T_1$ at which, this time under the influence of the pressure difference between the opposite gas passages 3 and 4, it triggers a natural rotation in the other direction, returned and amplified, at the end of step i', by active drive, in this reverse direction, of the rotary machine, operating then as a pump, during the rotation of step j', the mechanical drive being likewise interrupted shortly before reaching the low pressure at instant $T_2$, the rotary equipment continuing its rotation during step k', until it stops and triggers at time $T_2$, a rotation in the opposite direction, under the influence of the pressure differential between the passages 3 and 4 during step i, this rotation being accompanied and then amplified by mechanical drive during step j, as described above. Studies carried out by the applicant have shown that, with such a mode of operation, the duration of the autorotation decelerating phases k and k', of the order of one second, and the duration of the accelerating autorotation phases, of the order of 2 to 5 seconds, being completely compatible with the overall duration of most of the adsorption cycles (from 20 to 150 seconds according to the capacities and applications). On the other hand, one could use if needed the inertia of the rotary machine for the VSA cycles, for example, by means of inertial fly wheels, as the case may be associated with unidirectional centrifugal clutches.

Figure 2:
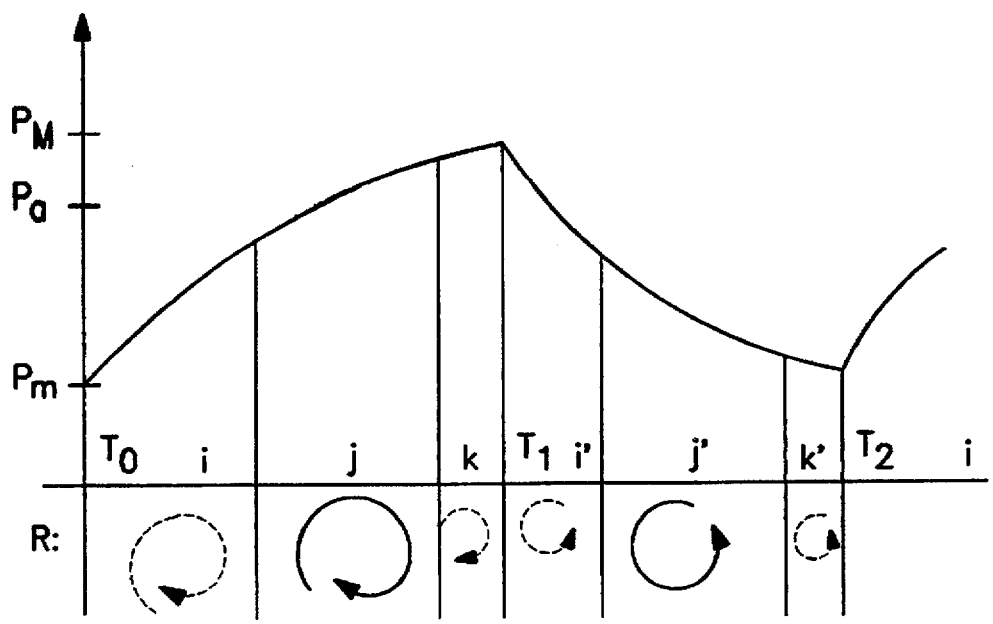
FIG. 2 is a schematic representation of a pressure cycle and corresponding rotation operations of the rotary machine.
Figure 3A:
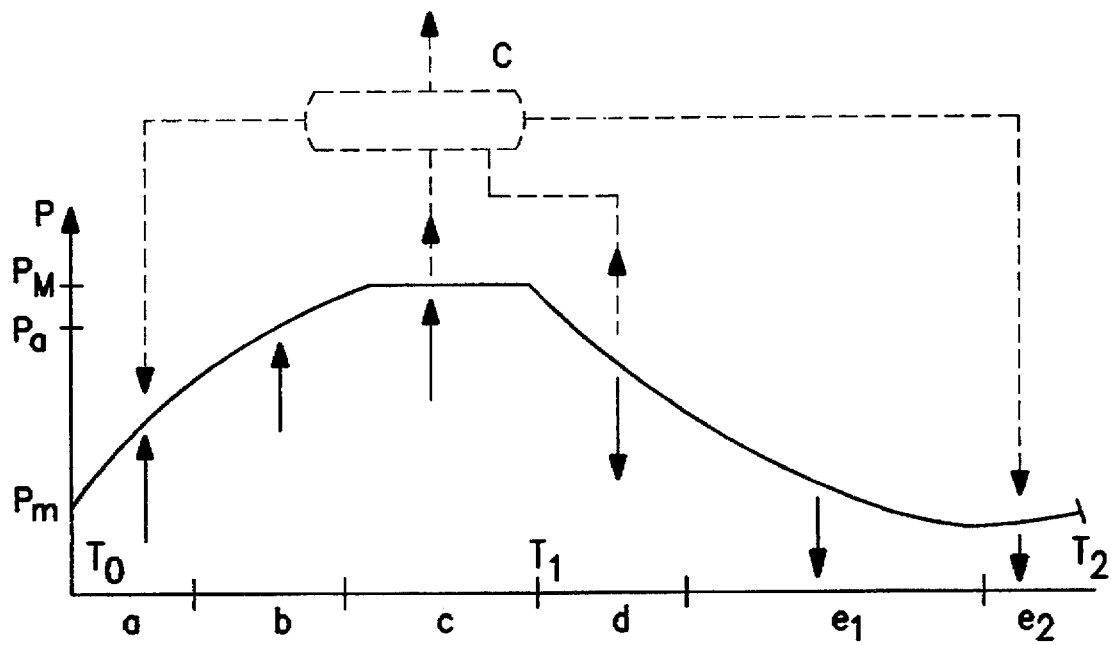
FIG. 3 is a graph of a cycle of characteristic pressures and of actuation of the valve of a unitary module according to FIG. 1.
Figure 3B:
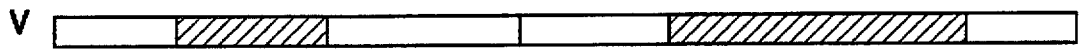

The pressure cycles of FIG. 2 are carried over to FIG. 3 on which are indicated the gas circulations at the inlet and outlet of the adsorber. The pressurization/production phase T0 to T1, during which mixture to be separated is introduced by the rotary machine R into the inlet 1 of the adsorber A, is broken down to an initial step a in which the valve V is open and the gas or gaseous mixture non-preferentially adsorbed, or the production gas, for example, oxygen, is introduced simultaneously in counter-current, through the outlet of adsorber A. This first pressurization step is followed by a second pressurization step b ensured by only the gaseous mixture to be separated, the valve V being closed. At the end of this second pressurization step b during which the pressure has exceeded atmospheric pressure, the valve V is again open for step c of production at slightly increasing pressure or substantially isobaric production at the high pressure of the cycle PM.

As explained above, at time T1, at the end of high pressure production of the cycle, the rotation of the rotary machine R reverses and a gaseous mixture rich in adsorbed components escapes by the inlet 1 during all the second phase T1–T2. In a first step d of this second phase, the valve V remains open so as to insure decompression simultaneously through the top and bottom of the adsorber, after which, during the step $e_1$, the valve V is closed and vacuum is drawn in the adsorber until the low pressure $P_m$ of the cycle continues to the end of phase $T_1$–$T_2$. Preferably, a little before time $T_2$, the valve V is reopened to affect a step $e_2$ of elution with production gas from the storage.

Because of its autonomy, a single-adsorber device according to FIG. 1 imposes no particular constraints as to the respective duration of the phases T0–T1 and T1–T2, nor of the constituent steps of these phases. The motor D can drive the blower at the same speed in both directions of rotation or at different speeds. Preferably, the rotary machine R is driven at maximum speed during step j' of pumping phase $T_1$–$T_2$ and at a lesser speed, typically about 50% of the maximum speed, in the air compression phase, during step j of phase T0–T1.

As a modification of the embodiment shown in FIG. 1, a second balancing storage, requiring a second valve V, can communicate with the conduit 0 to recover gas evacuated counter-current in phase d and to insure counter-current recompression during phase a.

As a modification, also, the feed to the motor can be interrupted at time $T_1$, or even after a short period of time after time $T_1$. In this case, the machine stops and naturally reverses during step d. Similarly, at the end of depressurization, the motor can be cutoff at time $T_2$, or even a short period of time after time $T_2$.

There is shown in FIG. 4 a separation device using two modules $M_1$ and $M_2$ comprising adsorbers $A_1$ and $A_2$, and inlet conduits $I_1$ and $I_2$ respectively, as described above with respect to FIGS. 1 to 3. In this case, the outlet conduits $O_1$ and $O_2$ are connected to an upstream portion O of the production line L provided with a shut-off valve $V_p$ whose opening and closing steps are shown, beside those of the valves $V_1$ and $V_2$, on the graph of FIG. 5 on which have been superposed the pressure cycles of the two modules $M_1$ and $M_2$. In this embodiment with two modules, the inlet of gas counter-current during the first step a of the pressurization/ production phase is insured by balancing or pseudo-balancing with the other adsorber beginning, in step d, its depressurization phase, the cycles of pressure and mechanical drive of the rotary machines $R_1$ and $R_2$ being moreover identical to those described above in relation to FIGS. 2 and 3.

In the devices with two modules, the duration of step a is, as has been seen, equal to the duration of step d and the duration of the phases T0–T1 and T1–T2 is the same in each module, the cycle of one adsorber being offset by one cycle phase relative to the other adsorber. As before, each rotary machine is driven at maximum speed during the pumping step j' and at reduced speed, typically half the maximum speed, during the pressurization phase j.

As will be understood, a device for the separation of gas by adsorption according to the invention can comprise a plurality of modules M in parallel, with appropriate synchronization between the different modules. Thus, for a three-module device, if the same duration is sought for steps a and d, for each module, the duration of the pressurization/ production phase T0–T1 is here equal to half the duration of the depressurization/desorption phase T1–T2, the modules having a time offset in their respective cycles of one-third of the total duration of the total cycle. For high cycle pressure between 1.3 and $1.5 \times 10^5$ Pa and a low cycle pressure comprised between 0.5 and $0.3 \times 10^5$ Pa, a single speed of the drive motor in one and the other direction gives the best energy/capital cost compromise.

For devices for the production of oxygen, the pressures $P_m$ and $P_m$ are typically those mentioned in the preceding paragraph, the total duration of one cycle being comprised typically between 30 and 120 seconds.

The autonomy of the modules according to the invention permits assembling them in batteries of n modules and using them, as need be, automatically or manually, in whole or in part. Moreover, in case of accident or module maintenance, the operation can be easily insured, at least temporarily, with n−1 modules.

Figure 6:
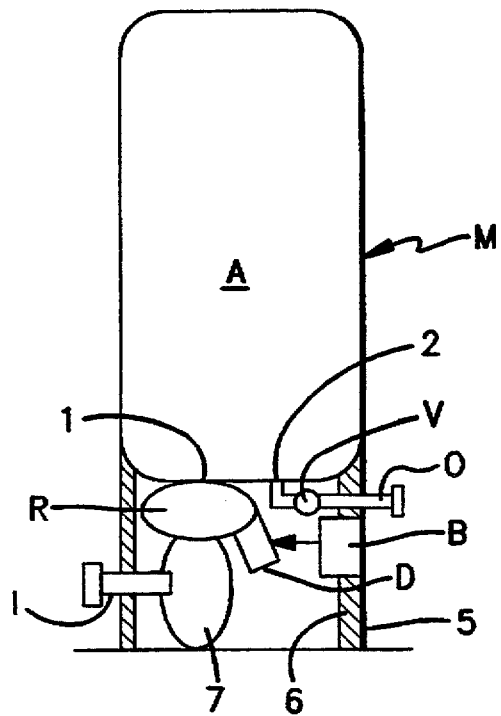
FIG. 6 is a schematic view of a practical embodiment of a unitary module according to FIG. 1.

There is shown in FIG. 6 a particular embodiment of a module according to the invention. As will be seen, the vertical adsorber A, typically with internal horizontal circulation of gas, has its outlet 2 likewise disposed in the lower portion, the adsorber A being supported by a frame 5 forming a skirt defining an internal volume in which are disposed the rotary machine R and its drive motor D, and the valve V, the frame 5 comprising a sound insulating coating 6. In FIG. 6, there is shown a regenerator 7 interposable between the inlet conduit 1 and the rotary machine R and permitting, during the cold period, recovering a portion of the heat energy of the pumping phase to reheat the gaseous mixture introduced into the adsorber in the compression phase. One could also insert a cooler, for example of the atmospheric type, between passage 4 of the rotary machine and inlet 1 of the adsorber.

We claim:

1. Process for using a device for the separation of gas by adsorption, said device comprising at least one module having:

an adsorber having an inlet adapted to receive a gaseous mixture to be separated and an outlet connectable to a utilization line of gas impoverished in at least one of the constituents of the gaseous mixture;

a reversible rotary machine having first and second opposed gas passages, the first passage communicating continuously with a source of said gaseous mixture, the second passage communicating continuously with the inlet of the adsorber; and means to actuate the rotary machine sequentially in opposite directions of rotation, wherein for each module, the process comprises: supplying the gaseous mixture to be separated to the inlet of the adsorber and alternately actuating the rotary machine during a first phase of pressurization and of production in one direction, then during a second phase of depressurization and desorption in the other direction.

2. Process according to claim 1, wherein of the rotary machine is interrupted for a predetermined period near the end of each phase.

3. Process according to claim 1, wherein the speed of the rotary machine is different according to the phases.

4. Process according to claim 1, wherein the outlet line is connectable to the utilization line via a valve, and the value is alternately open and closed during each phase.

5. Process according to claim 4, wherein the valve is closed during an intermediate period of each phase.

6. Process according to claim 1, wherein during a first portion of the first phase, said impoverished gas is simultaneously introduced into the adsorber through its outlet.

7. Process according to claim 6, wherein during a first portion of the second phase, said impoverished gas escapes simultaneously from the outlet of the adsorber.

8. Process according to claim 7, using at least two modules, wherein the first portions of the first and the second phases have the same duration.

9. Process according to claim 7, using two modules, wherein for each module, the first and the second phases have the same duration.

10. Process according to claim 7, using three modules, wherein for each module, the duration of the second phase is twice that of the first phase.

11. Process according to claim 10, wherein the rotary machine is driven substantially at the same speed during each of the phases.

12. Process according to claim 1, wherein during the first phase, the rotary machine is driven at a speed less than its speed of rotation during the second phase.

13. Process according to claim 1, wherein the mixture to be separated is air.

14. Device for the separation of gas by adsorption, comprising at least one module having:

an adsorber having an inlet adapted to receive a gaseous mixture to be separated and an outlet connectable to a utilization line of gas impoverished in at least one of the constituents of the gaseous mixture;

a reversible rotary machine having first and second opposed gas passages, the first passage communicating continuously with a source of said gaseous mixture, the second passage communicating continuously with the inlet of the adsorber; and means to actuate the rotary machine sequentially in opposite directions of rotation.

15. Device according to claim 14, which comprises at least two said modules disposed in parallel between the source and the utilization line.

16. Device according to claim 14, which further comprises a thermal regenerator switchable between the first passage and the source.

17. Device according to claim 14, wherein the adsorber is supported on a frame sheltering the rotary machine and comprising sound installation means.

18. Device according to claim 17, wherein the inlet and the outlet of the adsorber are located at the base of the adsorber.

19. Device according to claim 14, wherein the rotary machine is actuated by a variable speed electric motor.

20. Device according to claim 14, wherein the rotary machine is a Roots.

* * * * *